United States Patent [19]

Coker

[11] 4,094,044

[45] June 13, 1978

[54] TENSIONING DEVICE FOR TIGHTENING AND SECURING A HOLDING STRAP

[76] Inventor: J. O. Coker, 396 Hickory St., Lewisville, Tex. 75067

[21] Appl. No.: 716,436

[22] Filed: Aug. 23, 1976

[51] Int. Cl.² .................................................. A44B 21/00
[52] U.S. Cl. ................................... 24/68 CD; 24/68 E
[58] Field of Search ............. 24/19, 273, 68 R, 68 SB, 24/68 CD, 68 A, 68 E, 68 T, 69 R, 69 ST, 69 TS, 69 SB

[56] References Cited

U.S. PATENT DOCUMENTS

| 3,574,246 | 4/1971 | Norton et al. | 24/68 CD |
| 3,641,630 | 2/1972 | Farley | 24/68 CD |
| 3,860,998 | 1/1975 | Schnurmacher | 24/68 R |
| 3,866,272 | 2/1975 | Prete et al. | 24/68 CD |
| 3,887,966 | 6/1975 | Gley | 24/68 CD |

Primary Examiner—Werner H. Schroeder
Assistant Examiner—Moshe I. Cohen
Attorney, Agent, or Firm—Arthur T. Fattibene

[57] ABSTRACT

A tensioning device for tightening a holding strap and for securing a holding strap in a tightened position which includes a bracket having opposed arm portions to which there is pivotally connected a handle for rotation between an operative and inoperative position. A strap ring is pivotally connected to the handle for receiving the free end of the holding strap to be tightened. Rotation of the handle causes the holding ring to be rotated in unison therewith so that the holding strap is pulled tight and secured in the tensioned position by the rotation of the strap ring about the pivotal connection of the handle.

1 Claim, 5 Drawing Figures

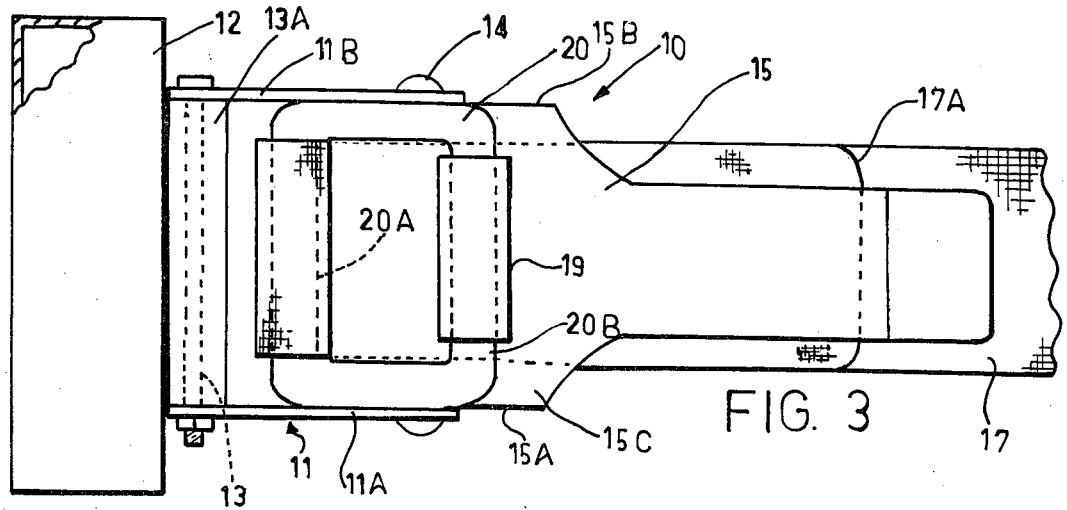
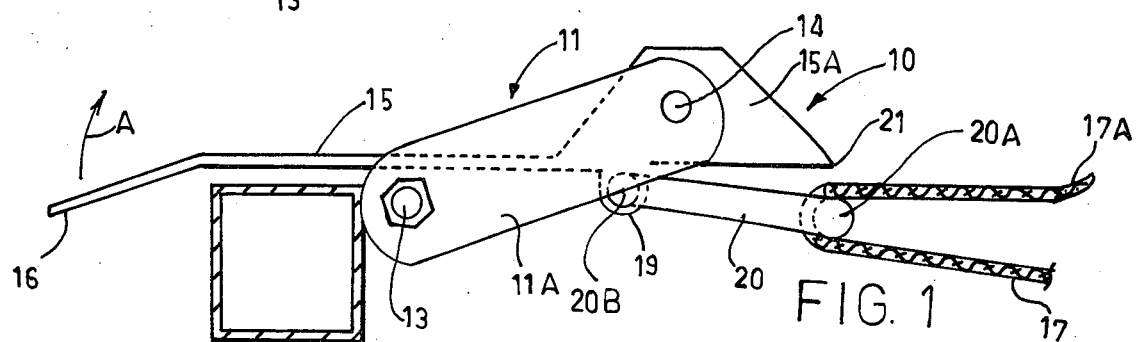
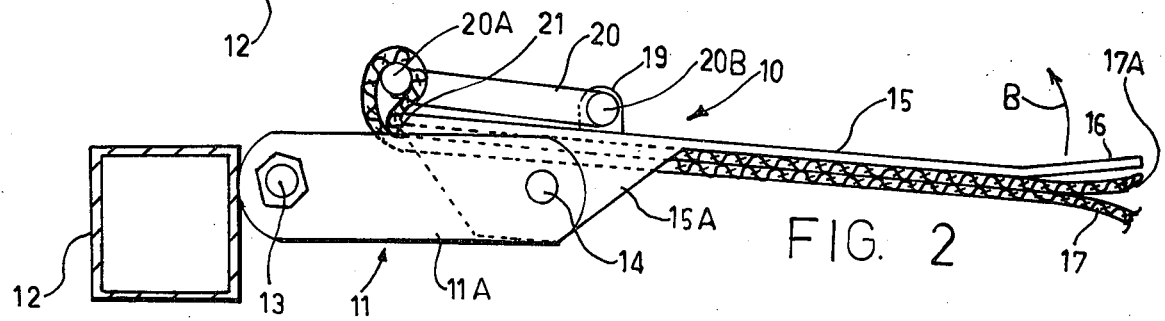
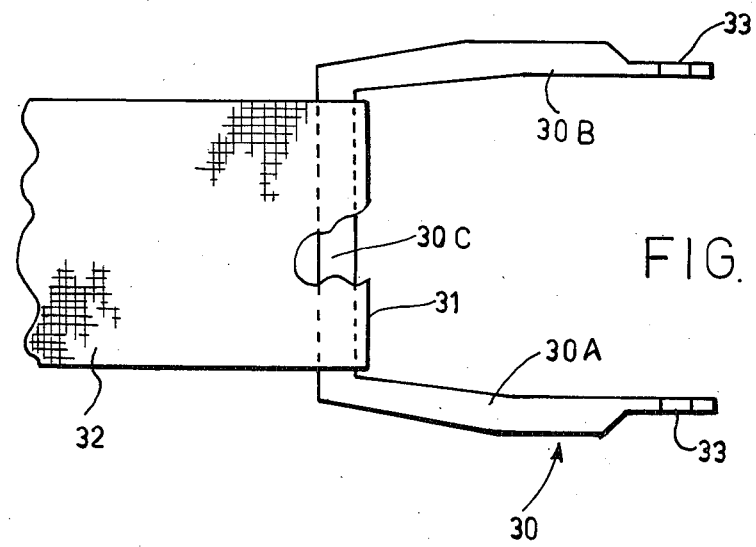

TENSIONING DEVICE FOR TIGHTENING AND SECURING A HOLDING STRAP

PROBLEM

In the moving arts, it is customary to utilize a dolly or hand truck to move relatively large and bulky articles. To secure such articles in position on such hand trucks or dolly, a holding strap is used. Such holding straps are usually attached to the dolly or lift and encircle the article supported thereon to prevent any shifting or displacement of the load. However, with the known holding straps, the buckles and means for securing the straps in a tightened position were either difficult to operate or did not sufficiently secure the object or load to the lift. Also once tightened, some of the known buckles were difficult to loosen.

OBJECTS

It is therefore an object of this invention to provide an improved tensioning device for tightening a holding strap and for securing the holding strap in a tightened position.

Another object is to provide a tensioning device for a holding strap in which the tightening and loosening of the strap can be readily effected with a minimum of effort and with a maximum of ease.

Another object is to provide a tensioning device which is relatively simple in construction and positive in operation.

SUMMARY OF INVENTION

The foregoing objects and other features and advantages are attained by a tensioning device which includes a bracket having spaced arm portions which is adapted to be pivotally connected to a portion of the lift or dolly structure or to one end of the holding strap. Pivotally connected to the free end of the bracket arm portions is a handle. The handle is constructed so that it can be readily rotated between an operative tightened position and an inoperative loosened position. Connected to the handle is a strap ring which is pivotally connected to the handle The strap ring receives the free end of the strap which is to be tightened. The arrangement is such that the free end of the strap is threaded through and looped about one end of the ring. The handle is then rotated through approximately 180° and in doing so, the strap ring is rotated therewith, and in doing so, tightens the strap accordingly. The tensioned strap is positively secured in the tensioned position as the strap ring and handle passes through a dead center position.

FEATURES

A feature of this invention resides in the provision of a tensioning device which can be readily attached to the structure of a lift or dolly or can be attached to one end of a holding strap.

Another feature resides in the provision of a tensioning device which is self-locking in the tensioned position of the strap.

Another feature resides in the provision of a tensioning device in which the mechanical advantage is such that only very little effort is required to tension a holding strap into a positive secured position.

Other features and advantages will become more readily apparent when considered in view of the drawings and specification in which:

FIG. 1 is a detail side view of a tensioning device embodying the invention illustrated in an inoperative or loosened position.

FIG. 2 is a detail side view of the tensioning device of FIG. 1 shown in the operative or tightened position.

FIG. 3 is a detailed front view of the tension device shown in the tensional position of FIG. 2.

FIG. 5 is a detailed view of a modified bracket means.

DETAILED DESCRIPTION

Figure 4:
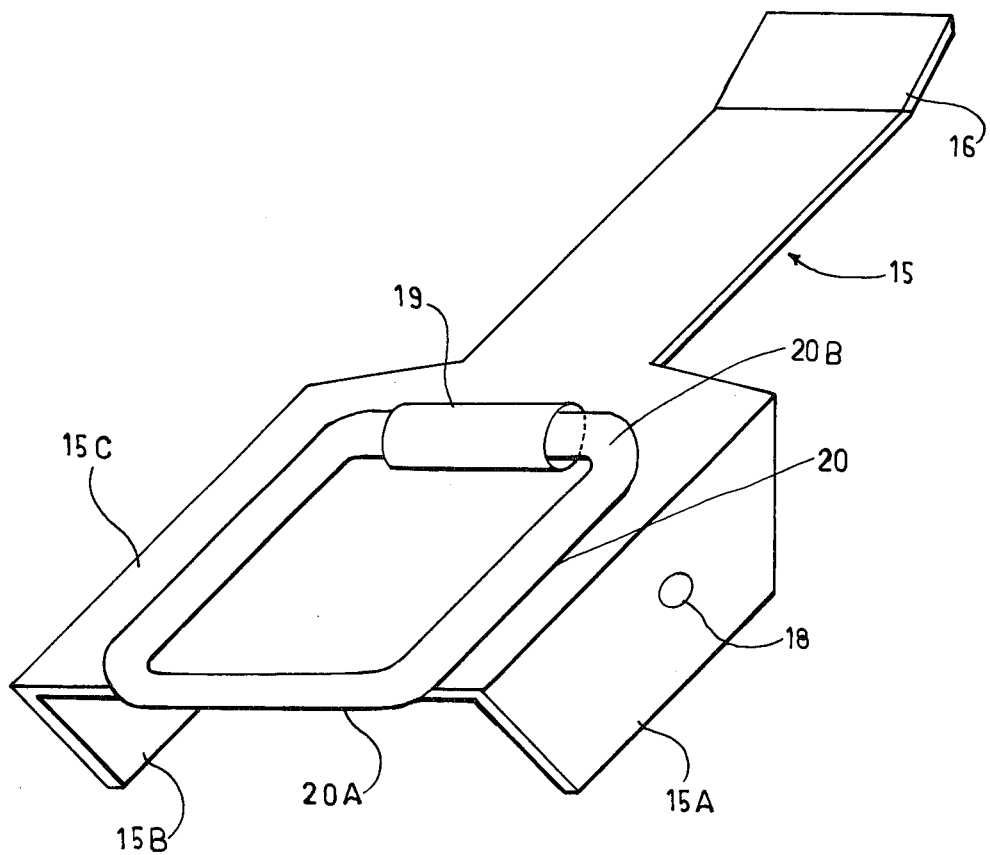
FIG. 4 is a detail perspective view of the handle means of the tensioning device.

Referring to the drawings there is shown in FIGS. 1 to 3 a tensioning device embodying the present invention. The tensioning device has particular application for tightening and securing a holding belt or strap 17 for securing a load on a lift or dolly; e.g., a lift as described in my U.S. Pat. No. 3,536,220 granted Oct. 10, 1970.

As shown in FIGS. 1 to 3, the tensioning device 10 comprises a bracket means 11 which is pivoted to the frame structure or portion 12 of a lift. The bracket means includes a pair of spaced apart arm portions 11A and 11B which are pivoted at one end to the lift structure 12 by a hinge or pivot pin 13. The pin 13 extends through a spacer sleeve 13A which is suitably secured to the lift structure 12, and which also functions to maintain the arm portions 11A and 11B in spaced relationship.

Pivotally connected to the other ends of arm portions 11A and 11B by means of a hinge or pivot pin 14 is a handle means 15. As best seen in FIG. 4, the handle means includes a pair of opposed side leg portions 15A and 15B interconnected by a web or back portion 15C. The web or back portion 15C is extended to define a handle 16 whereby it can be grasped by an operator to effect the tensioning of a holding strap 17.

The respective leg portions 15A and 15B of the handle means are each provided with an aligned hole 18 for receiving pivot pin 14 in the assembled position. Thus, as best seen in FIGS. 1 and 2, the handle means 15 is rotatable about pin 14 between an operative position (FIG. 2) and an inoperative position (FIG. 1).

Connected to the back side of the web portion 15C is a hinge sleeve 19 to which a strap ring 20 is hingedly connected. In the illustrated embodiment the strap ring 20 is rendered generally rectangular. In the loosened or inoperative position, as shown in FIG. 1, it will be noted that the hinged sleeve 19 is disposed between pivots 13 and 14. In the operative position of FIG. 2, the hinge sleeve 19 has been shifted to be disposed to the opposite side of pivot pin 14; as will be hereinafter described.

In operation, with the tensioning device in the inoperative or open position, as seen in FIG. 1, the free end 17A of the holding strap is threaded through the strap ring 20 and is reversely folded about the ring portion 20A which is opposite the ring hinged portion 20B. It will be understood that the free end 17A of the strap is threaded in ring 20 as the remainder of the strap encircles the load to be secured to the lift. The strap 17A is then pulled to ensure a firm encirclement of the load.

To finally secure and to tension the strap 17 tightly, the operator need only to pivot the end 16 of the handle in the direction of arrow A in FIG. 1. In doing so, pivot 14 is moved through the dead center alignment of pivots 13, 20B and 14. In doing so, the edge 21 of the handle means engages the reversed end 17A of the strap and prohibits the strap from slipping as the ring 20 is rotated in unison with handle 15 to the operative position as shown in FIG. 2. In the operative or tightened position, the hinge ring portion 20B is disposed to the right of hinge pin 14 as seen in FIG. 2. The strap 17 is threaded and secured about ring portion 20A so as to prevent any slippage from occurring. Thus, the strap is locked in its tensioned or tightened position as the hinged end 20B of the ring is moved through dead center as seen in FIG. 2. With the construction described, any slack in the strap can be readily taken out, and the load secured to the lift until such time that it can be released.

To release the fastening or tensioning device, an operator need only to pivot the handle 15 in the direction of arrow B as shown in FIG. 2. In doing so, the tension on the strap is released and the free end 17A can be then loosened from the ring 20 to free the load.

FIG. 5 illustrates a modified bracket means 30 which may be used in lieu of arm portions 13A, 13B. Bracket means 30 enables the tension device to be secured to the strap. As shown in FIG. 5, the bracket means 30 includes side arm portions 30A, 30B interconnected by a bight portion 30C which is threaded through a looped end 31 of a belt 32. The free ends of bracket arms 30A, 30B are provided with aligned holes 33 by which the handle means 15 (as described with respect to FIGS. 1 to 3) is pivotally connected, e.g., by hinge pin 13. In all other respects the structure and function of the tensioning device is as hereinbefore described.

While the invention has been described with respect to a particular embodiment thereof, it will be appreciated and understood that variations and modification may be made without departing from the spirit or scope of the invention.

What is claimed is:

1. A strap tensioning device for tightening and securing a holding strap in a tensioned position comprising:
  a bracket means including a pair of spaced apart arm portions,
  a pin interconnected between said arm portion adjacent one end thereof,
  a handle means including a pair of opposed side leg members and a web portion interconnected therebetween,
  said web portion having a transverse edge portion at one end and having a reduced extension defined as an extended handle portion disposed opposite to said edge portion,
  pivot pin connecting the opposite side leg members of said handle means to the other end of a corresponding bracket arm portion,
  a strap ring adapted to receive the free end of a holding strap,
  said strap ring having opposed portions defining a ring hinging portion and a strap holding portion, said strap holding portion being disposed contiguous to said transverse edge portion in the tensioned position of said device,
  means for pivotally connecting said ring hinging portion to said web portion whereby the pivot means of said strap ring is disposed between the ends of said arm portions in the loosened position of a strap, and
  whereby the holding strap is tightened and secured by rotating said handle means approximately 180° so that the pivot means of said strap ring is located beyond the end of said arm portions of said bracket means, and whereby said transverse edge and strap holding portion clamps said strap therebetween upon rotating said handle means toward a tightened position.

* * * * *